(12) United States Patent
Lederer

(10) Patent No.: US 9,519,375 B2
(45) Date of Patent: Dec. 13, 2016

(54) PORTABLE DEVICE

(71) Applicant: Unify GmbH & Co. KG, Munich (DE)

(72) Inventor: Thomas Lederer, Herrsching (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/506,043

(22) Filed: Oct. 3, 2014

(65) Prior Publication Data

US 2015/0097790 A1 Apr. 9, 2015

(30) Foreign Application Priority Data

Oct. 7, 2013 (DE) .................. 20 2013 008 906 U

(51) Int. Cl.
*G06F 3/041* (2006.01)
*G06F 3/0488* (2013.01)
*H04M 1/725* (2006.01)

(52) U.S. Cl.
CPC ......... *G06F 3/0416* (2013.01); *G06F 3/04883* (2013.01); *H04M 1/72522* (2013.01); *G06F 2203/04104* (2013.01); *H04M 2250/22* (2013.01)

(58) Field of Classification Search
CPC .... H01L 27/1225; H01L 29/045; H01L 29/24; H01L 29/45; H01L 29/78606; H01L 29/7869
See application file for complete search history.

(56) References Cited

U.S. PATENT DOCUMENTS

| | | | | |
|---|---|---|---|---|
| 6,323,846 B1* | 11/2001 | Westerman | ........... | G06F 3/0235 345/173 |
| 2008/0158146 A1* | 7/2008 | Westerman | ............. | G06T 7/401 345/156 |
| 2008/0165141 A1* | 7/2008 | Christie | .................. | G06F 3/044 345/173 |
| 2009/0095540 A1* | 4/2009 | Zachut | .................... | G06F 3/044 178/18.03 |
| 2011/0093821 A1* | 4/2011 | Wigdor | ............... | G06F 3/04812 715/863 |
| 2013/0106776 A1* | 5/2013 | Park | ..................... | G06F 3/04883 345/174 |
| 2013/0328832 A1* | 12/2013 | Boumgarten | ......... | G06F 3/0418 345/174 |

\* cited by examiner

*Primary Examiner* — Olga Merkoulova
(74) *Attorney, Agent, or Firm* — Buchanan Ingersoll & Rooney PC

(57) ABSTRACT

An improved portable device has at least one touch-sensitive input surface for operator input and at least one sensor for detecting the input on the input surface. There is at least one sensor for monitoring the input surface which is designed to receive large-area and/or nearly simultaneous inputs, and at least one preset special function on the device which is able to be triggered by large-area input and/or nearly simultaneous inputs.

17 Claims, 3 Drawing Sheets

PORTABLE DEVICE

FIELD OF INVENTION

The invention relates to a portable device with at least one input surface that is touch-sensitive for input by an operator, and at least one sensor to detect the input on the input surface.

BACKGROUND OF THE INVENTION

Typically a mobile radio device or a smartphone, is operated via a touchscreen, which encompasses the touch-sensitive input surface. Random, inadvertent contact with the touchscreen, e.g., when handling the portable/mobile device, could lead to incorrect operation. Thus, an operator could pick up the unlocked device, e.g., a smartphone, to put it in a pocket, and in doing so unintentionally select an entry in a call list and make a call using the device.

Furthermore, for many operations like inputting the correct code, e.g., a PIN or a pattern, to unlock the device, the operator has to touch a comparably small operating area. Along with increased concentration on the part of the operator, i.e., the user, this also requires a certain period of time. A similar problem arises when rejecting an incoming call or quickly muting the device's microphone in certain situations like when the operator is on a call.

SUMMARY OF THE INVENTION

The task of the invention is to improve the operability of a portable device such as to prevent incorrect operation from accidental contact and to simplify and shorten operation.

This task is solved by a device with the features of claim 1. Advantageous refinements of the invention are a subject of the dependent claims.

A device according to the invention is characterized by at least one sensor for monitoring the input surface which is designed for large-area and/or nearly simultaneous inputs, and by at least one preset special function on the device and able to be triggered by large-area input and/or nearly simultaneous inputs.

The device design according to the invention allows a device typically at rest to be monitored regarding large-area and/or nearly simultaneous contact in such a way as to ignore random contact on the input surface that is not associated with an operation, and as not to trigger any special functions on the device. The invention prevents unintentional incorrect operation of mobile devices with touch-sensitive input surfaces, particularly with touch displays, and it enables an intentional triggering of special device functions, like muting.

In an advantageous design of the device according to the invention, the at least one sensor is designed to detect a large-area input with contact in at least one area of the input surface, in which at least one area encompasses at least one-third of the input surface. This increases the operating reliability of the portable device, since inadvertently covering a small part of the input surface—particularly less than one-third of the input surface—is not detected as a large-area input and incorrect operation is prevented accordingly. The special function can be triggered by a large-area input and can, for example, be muting the device for an incoming call or muting the device's microphone during a call conducted on the device.

In another advantageous design of the device according to the invention, the at least one sensor is designed to detect a large-area input with contact in at least one area of the input surface, in which at least one area is specifiable by making at least partial contact with one or more fingers and/or a palm of the operator. In this special design of the device according to the invention, a special function can be triggered by making contact using an entire palm, a flat thumb, or the ball of a thumb. Because the area assigned for a large-area input is designed according to the design of partial contact of an operator's hand, a particularly high level of operating reliability can be achieved for the device.

In an advantageous design of the device according to the invention, the at least one sensor is designed to detect contact on multiple—at least two—areas of the input surface within a preset time period, preferably less than 0.5 seconds, particularly less than 0.2 seconds. In this way, nearly simultaneous contacts, which could be detected when storing a device in a pocket, for example, can be used to trigger an appropriate special function, like at least temporarily deactivating the at least one sensor for detecting input on the input surface and/or a touch display assigned for the input surface.

It is also advantageous that the at least one sensor is designed to detect the arrangement and/or design of the area, and that the respective special function can be triggered for at least one preset arrangement and/or design of the area. In this advantageous design of the invention, a simple option for unlocking the device, like the unlocking of a smartphone, can be realized. In addition, the pattern of the finger silhouette can be saved when programming the lock, and subsequently used to identify the corresponding operator.

Advantageously, the at least one input surface is integrated into a device's display, preferably in a multi-touch screen. Preferably as a special function, at least one part, particularly a display, of the device must be able to be activated and/or deactivated, locked and/or unlocked. In addition, the at least one sensor can be used to detect the inputs on the input surface with additional sensors, like a motion sensor, of the device, in such a way that a large-area input or a multi-point/multi-touch contact can be combined with an additional sensor-based evaluation, e.g., movement of the device.

In addition, the invention can be used in an advantageous manner when the device is a communication device, particularly a smartphone, in which as a special function, an outgoing or incoming communication connection can be disconnected and/or a signal generated by the device, like a device ringtone, can be changed, particularly deactivated. In this way, large-area and/or multiple contacts can be used to quickly control the device. The invention can also be advantageous on other devices, which could include MP3 players and DVD/Blu-ray players.

Furthermore, the input surface can be part of a touchpad and/or the device can be a portable computer like a laptop or an ultrabook.

Other advantages and features of the invention are shown in the figures and the description of the drawing. The features shown in the figures are purely schematic and are not to be considered to scale. The features specified above and cited below can each be implemented according to the invention individually or in any combination in a portable device.

DESCRIPTION OF THE PREFERRED EMBODIMENTS

Figure 1:
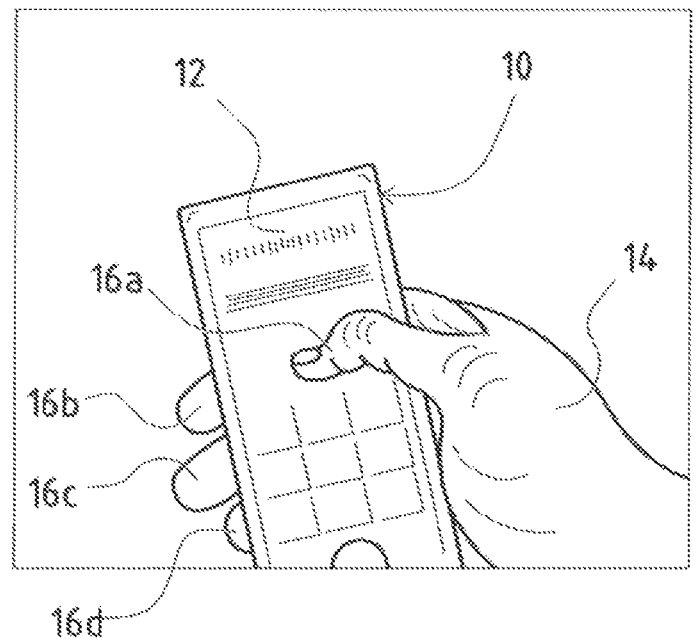
FIGS. 1, 2, 3*a*, 3*b*, 4*a* and 4*b* are perspective views of a portable device being operated by an operator in different operating situations.

A portable device 10 shown in the FIGS. 1 though 4b is designed as a smartphone in an exemplary, but not limiting, manner, and it has an input surface 12 on the shown front side that is integrated into a multi-touch display.

FIG. 1 shows that using a finger—here a thumb 16a of a hand 14 of an operator not otherwise shown—an input can be made on the device 10 by touching the input surface 12.

Figure 2:
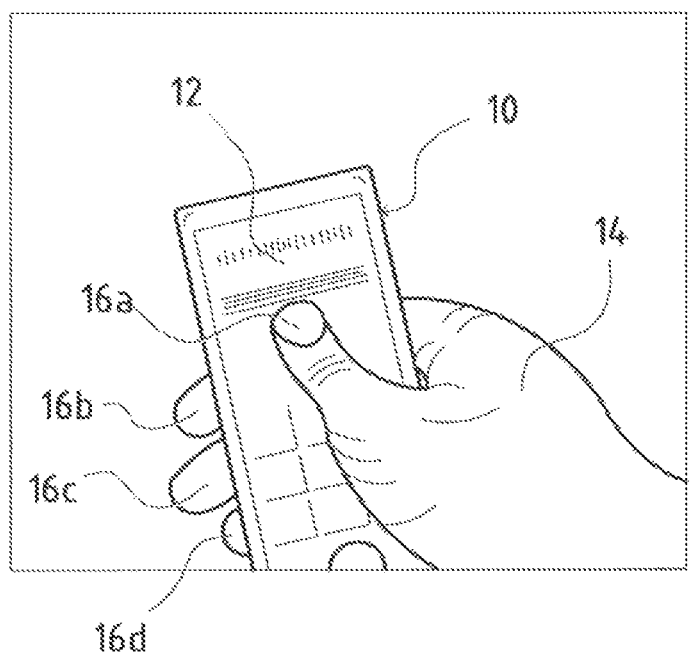

In contrast with FIG. 1, which illustrates normal use of the device 10, FIG. 2 shows the triggering/ability to trigger a special function by contacting a large area of the input surface 12 with the thumb 16a. The thumb 16a placed flat on the input surface 12 in such a way that a large area of the input surface 12 is contacted by the thumb 16a in comparison to FIG. 1—not just the tip of the thumb 16a—and thus a large-area input is made on the input surface 12.

Figure 3A:
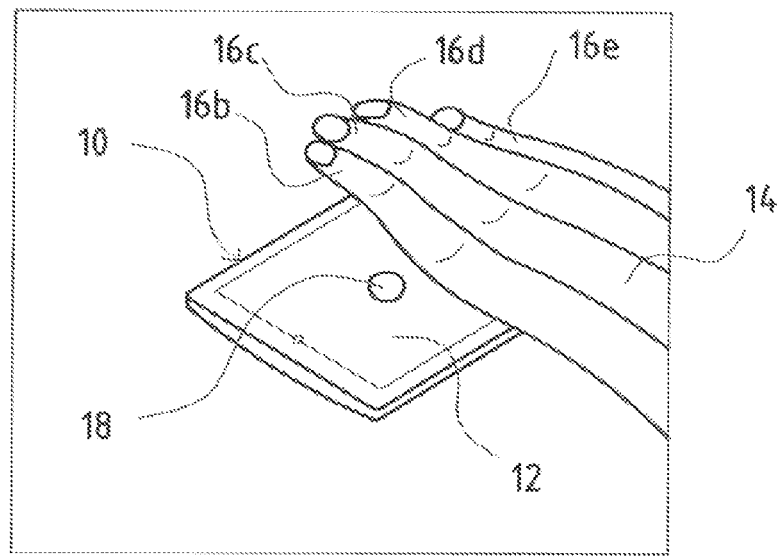
Figure 3B:
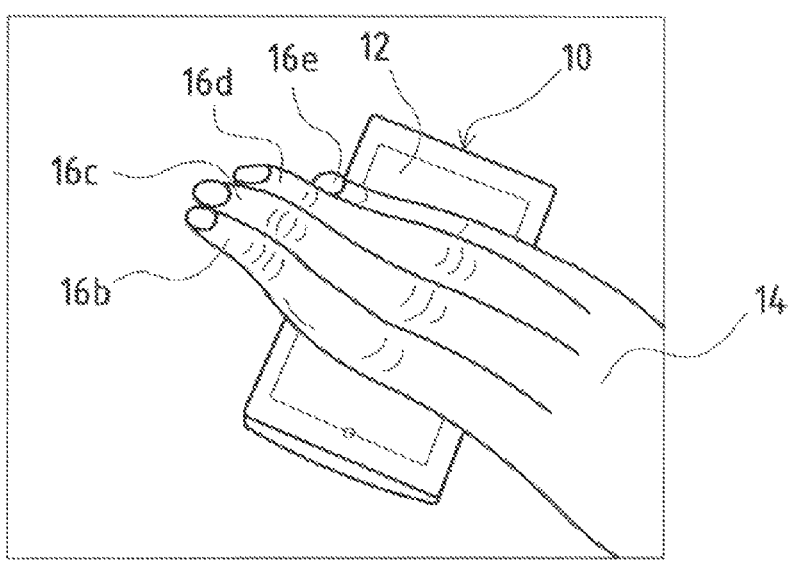

FIGS. 3a and 3b show the triggering of an additional special function with the operator's hand 14. FIG. 3a illustrates an incoming call on the device 10, in which a telephone handset symbol 18 is shown on the display encompassing the input surface 12. To reject the incoming call and/or turn off the device's 10 ringtone, the operator places her fingers 16b-16e flat on the input surface 12, and this triggers a large-area input on the device 10, see FIG. 3b. The situation shown in FIG. 3a and FIG. 3b can, for example, occur during a business meeting or a visit to a restaurant by the operator of the device 10.

The operation of the special function shown in FIG. 2 and FIG. 3b can take place without increased attention from the operator. Another advantage is that the respective additional function, like muting the device 10 no longer has to be shown on the display of the device 10.

Figure 4B:
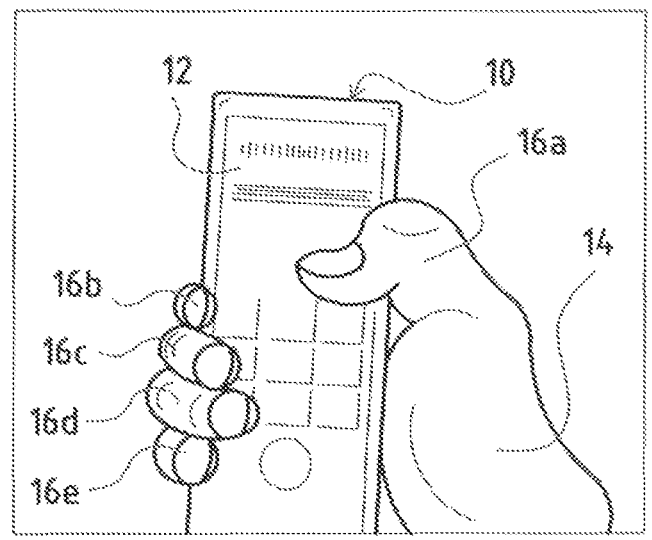
Figure 4A:
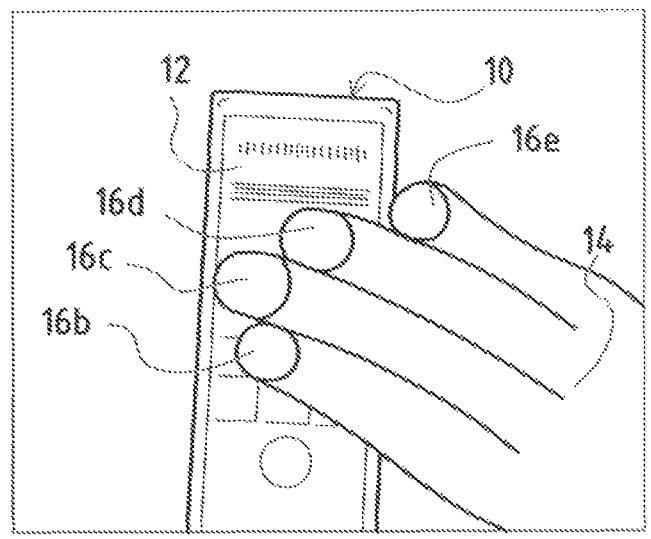

FIGS. 4a and 4b illustrate multi-touch contact, i.e., nearly simultaneous inputs, on the input surface 12 of the device 10. FIG. 4a illustrates how a special function—here unlocking the device 10 or its display—can be triggered by placing multiple—here three—fingers 16b, 16c, 16d on the input surface 12. The sensors detect the pattern of the contact for the three fingers 16b-16d, and if the detected pattern matches with a saved, user-specific finger pattern, the device 10 unlocks.

In contrast to the situation shown in FIG. 4a, in FIG. 4b, none of the saved finger patterns match the multi-touch contact. With a hand 14 grabbing the device 10, the thumb 16a and all of the fingers 16b-16e are touching the operating/input surface 12 of the device 10, particularly in the edge areas of the input surface 12. Since this contact is not assigned any saved finger pattern, no special function is triggered in the exemplary embodiment shown in FIG. 4b. However, it is also conceivable that nearly simultaneous inputs, e.g. the fingers 16b-16e, on the input surface 12 could trigger a special function on the device 10, e.g., deactivating the multi-touch display of the device 10 at least temporarily.

What is claimed:

1. A portable device comprising:
   a display device having a touch-sensitive input surface configured to receive operator input;
   at least one sensor configured to detect the operator input provided via contacting of the input surface;
   the at least one sensor configured to monitor the input surface to receive a large area input, the large area input being an input in which at least one third of an entirety of an area of the input surface is contacted;
   the portable device configured to trigger a first function in response to receiving the large area input;
   wherein the at least one sensor is also configured to detect a plurality of nearly simultaneous inputs, the simultaneous inputs comprising a first input from an object making a first contact on the input surface and a second input from the object making a second contact on the input surface within 0.5 seconds of the first contact; and
   wherein the portable device is configured to trigger a deactivation of at least one of (i) the display device and (ii) at least one sensor configured to detect input on the input surface in response to the detection of the nearly simultaneous inputs.

2. The portable device of claim 1, wherein the at least one sensor is configured so that a large area input is only detected when at least one third of the entirety of the area of the input surface is contacted by an object and a pattern of contact of the object contacting the input surface is determined to match a pattern saved in non-transitory memory of the portable device.

3. The portable device of claim 2, wherein the pattern saved in non-transitory memory of the portable device is a user-specific finger pattern.

4. The portable device of claim 2, wherein the first function is turning off a ringtone of the portable device.

5. The portable device of claim 2, wherein the first function is unlocking the portable device.

6. The portable device of claim 2, wherein the first function is rejecting an incoming call.

7. The portable device of claim 2, wherein the first function is deactivating the display device.

8. The portable device of claim 2, wherein the first function is activating the display device.

9. The portable device of claim 2, wherein the first function is deactivating the display device for a predetermined period of time.

10. The portable device of claim 2, wherein the first function is turning off of a microphone of the portable device.

11. The portable device of claim 2, wherein the first function is muting of the portable device.

12. The portable device of claim 2, wherein the portable device is a smartphone, a laptop computer, or a portable computer.

13. The portable device of claim 1, wherein the second input is from the object making a second contact of the input surface within 0.2 seconds of the first contact.

14. A method of using a portable device comprising:
   monitoring an input surface of a touch display of the portable device to detect a large area input, the large area input being an input in which at least one third of an entirety of an area of the input surface is contacted;
   triggering a first function of the portable device in response to detecting the large area input, the large area input only being detected when at least one third of the entirety of the area of the input surface is contacted by an object and a pattern of contact of the object contacting the input surface is determined to match a pattern saved in non-transitory memory of the portable device;
   detecting a plurality of nearly simultaneous inputs provided via contacting the input surface, the nearly simultaneous inputs comprising a first input from an object making a first contact on the input surface and a second input from the object making a second contact on the input surface within 0.5 seconds of the first contact; and
   triggering deactivation of at least one of the touch display, and at least one sensor configured to detect input on the input surface of the touch display in response to the detecting of the nearly simultaneous inputs.

15. The method of claim 14, wherein the pattern saved in non-transitory memory of the portable device is a user-specific finger pattern; and
wherein the first function is one of:
turning off a ringtone of the portable device,
unlocking the portable device;
rejecting an incoming call,
deactivating the touch display of the portable device,
activating the touch display of the portable device,
deactivating the touch display for a predetermined period of time,
turning off of a microphone of the portable device, and
muting of the portable device.

16. A portable device comprising:
a display device having a touch-sensitive input surface configured to receive operator input;
at least one sensor configured to detect the operator input provided via contacting the input surface;
the at least one sensor configured to detect a plurality of nearly simultaneous inputs, the nearly simultaneous inputs comprising a first input from an object making a first contact on the input surface and a second input from the object making a second contact on the input surface within 0.5 seconds of the first contact; and
wherein the portable device is configured to trigger a deactivation of at least one of (i) the display device and (ii) the at least one sensor configured to detect the operator input in response to the detecting of the nearly simultaneous inputs.

17. The portable device of claim 16, wherein the portable device is a smartphone, a laptop computer, or a portable computer.

* * * * *